(No Model.)

F. G. PERKINS.
BUSHING FOR PULLEYS.

No. 404,300. Patented May 28, 1889.

Witnesses:
P. L. Brooks.
C. W. Seville.

Inventor
F. G. Perkins
By his Attorney

UNITED STATES PATENT OFFICE.

FRANK G. PERKINS, OF MISHAWAKA, INDIANA.

BUSHING FOR PULLEYS.

SPECIFICATION forming part of Letters Patent No. 404,300, dated May 28, 1889.

Application filed July 11, 1888. Serial No. 279,680. (No model.)

*To all whom it may concern:*

Be it known that I, FRANK G. PERKINS, of Mishawaka, in the county of St. Joseph and State of Indiana, have invented certain new and useful Improvements in Bushings for Pulleys; and I do hereby declare that the following is a full, clear, and exact description thereof, reference being had to the accompanying drawings, and to the letters of reference marked thereon, which form part of this specification, in which—

Figure 1:
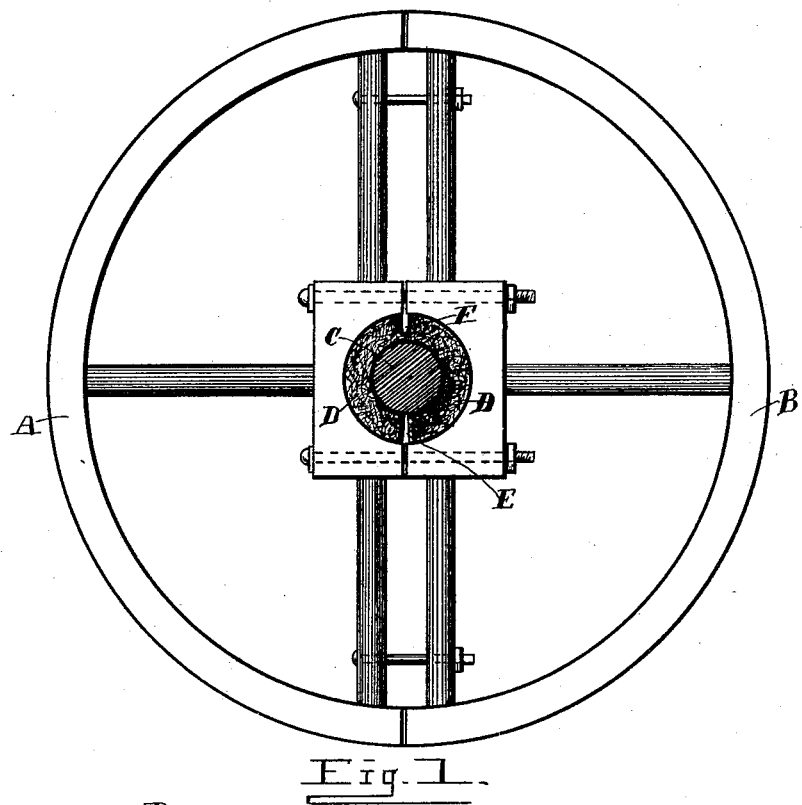
Figure 2:
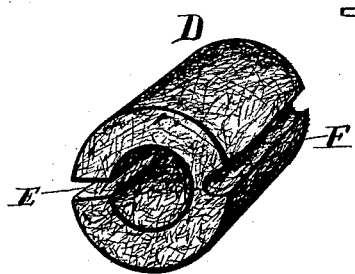
Figure 3:
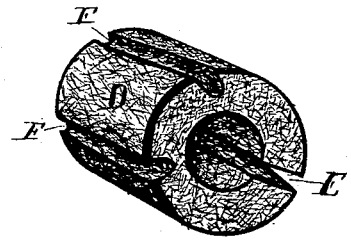

Figure 1 is a side view of a split pulley, showing my improved bushing applied. Fig. 2 is an end view of the bushing detached. Fig. 3 is a view of a modified construction of bushing.

This invention is an improved bushing for pulleys, it being especially designed for use with split pulleys, where a bushing is interposed between the hub of the pulley and the shaft to accurately and securely mount the pulley thereon.

The invention consists in a flexible bushing having certain novel details of form and construction, as are hereinafter more fully described, and clearly stated in the claims.

Reference being made to the accompanying drawings by letter, A and B designate the opposite sections of a split pulley having a diametrically-divided hub, such sections being clamped together by bolts and the pulley being of any ordinary construction.

C is the shaft on which the pulley is mounted.

D is the bushing interposed between the hub of the pulley and the shaft. This bushing is made of a flexible material, such as wood pulp or paper, or other fibrous and suitable material. The constituents of the bushing not being the essential elements of the present invention are not herein claimed. The bushing is formed by compressing or molding such material into tubes of proper diameter and thickness, from which tube-sections or sleeves of desired length are cut to form the bushing. After severing the sections they are split longitudinally at one side, as at E, so that the bushing can be distended and sprung around a shaft by reason of such split. The external surface of the bushing diametrically opposite split E, as shown in Figs. 1 and 2, is longitudinally grooved at F, and, if desired, more than one such groove may be formed—for instance, as shown in Fig. 3. The bushing usually should be of slightly smaller internal diameter or bore than the shaft upon which it is placed, so that when the pulley hub-sections are bolted around it the bushing will be compressed and firmly bite the shaft. The groove or grooves in the external surface of the bushing permit its readier and more equal compression around the shaft without subjecting it to any great tearing strain, as would be the case were the external surface of the bushing continuous or unbroken. Further, when the bushing is clamped between the parts of the sectional hub it should be so adjusted that the joints of the hub will be directly over split E and one groove F, whereby when the sections are forcibly closed there will be no pinching or crimping of the bushing between or under the joints, and thus the fitting of the pulley is not liable to be rendered inaccurate by the unequal drawing of the bushing.

Preferably the material of which the bushing is made is treated or mixed with sand, emery dust, or similar substances to increase the bite of the bushing on the shaft when compressed. The flexibility of the bushing allows it to readily adjust itself to the surface of the shaft or hub, so that any roughness or inequalities of said shaft or hub will but increase the binding of the bushing thereon. The bushing being in one piece and sprung on the shaft, as described, can be more readily put in position, and requires no support to retain it until clamped by the hub, as do bushings made in separable sections.

The bushing can be readily fitted to a smaller shaft by paring the edges of slit E, as is evident. The grooves F and slit might be formed when the bushing is molded, if found desirable.

Having described my invention, I claim—

1. The herein-described bushing for split pulleys, consisting of a cylindrical tube or sleeve composed of a flexible fibrous material split longitudinally at one side, so that it can be opened and sprung over a shaft, and longitudinally grooved on its exterior surface, substantially as and for the purpose specified.

2. The combination of the shaft and the sectional pulley having a diametrically-divided hub with the bushing D, composed of a flexible fibrous material having a longitudinal split, E, and an external groove, F, diametrically opposite said split, said bushing being interposed between the pulley-hub and shaft in such position that the joints of the hub will come, respectively, over split E and groove F, substantially as set forth.

In testimony that I claim the foregoing as my own I affix my signature in presence of two witnesses.

FRANK G. PERKINS.

Witnesses:
 JAMES DUSHANE,
 JEANIE ANDERSON.